United States Patent
Karnin et al.

(10) Patent No.: US 8,818,875 B2
(45) Date of Patent: Aug. 26, 2014

(54) POINT OF SALE SYSTEM WITH ITEM IMAGE CAPTURE AND DEFERRED INVOICING CAPABILITY

(75) Inventors: Ehud Dov Karnin, Koranit (IL); Eugeniusz Walach, Haifa (IL)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1324 days.

(21) Appl. No.: 12/235,605

(22) Filed: Sep. 23, 2008

(65) Prior Publication Data

US 2010/0076855 A1   Mar. 25, 2010

(51) Int. Cl.
*G07G 5/00*   (2006.01)

(52) U.S. Cl.
USPC ............................................. 705/24; 186/61

(58) Field of Classification Search
USPC ............... 705/26.1, 30, 34, 24; 198/349, 358; 186/55, 61, 66; 235/378, 380, 383, 235/385, 375, 376
See application file for complete search history.

(56) References Cited

U.S. PATENT DOCUMENTS

| | | | | |
|---|---|---|---|---|
| 5,154,260 A * | 10/1992 | Patel | | 186/55 |
| 5,256,864 A * | 10/1993 | Rando et al. | | 235/462.14 |
| 5,380,991 A * | 1/1995 | Valencia et al. | | 235/383 |
| 5,497,314 A * | 3/1996 | Novak | | 705/17 |
| 5,679,941 A * | 10/1997 | Iizaka et al. | | 235/383 |
| 5,883,968 A * | 3/1999 | Welch et al. | | 382/100 |
| 5,920,056 A * | 7/1999 | Bonnet | | 235/383 |
| 5,923,017 A * | 7/1999 | Bjorner et al. | | 235/385 |
| 5,969,317 A * | 10/1999 | Espy et al. | | 235/378 |
| 6,260,023 B1 * | 7/2001 | Seevers et al. | | 705/20 |
| 6,431,446 B1 * | 8/2002 | Gu et al. | | 235/454 |
| 6,435,407 B1 * | 8/2002 | Fiordelisi | | 235/383 |
| 6,512,919 B2 * | 1/2003 | Ogasawara | | 455/422.1 |
| 6,588,549 B2 * | 7/2003 | Wike et al. | | 186/61 |
| 6,793,043 B2 * | 9/2004 | Nguyen | | 186/59 |
| 6,991,066 B2 * | 1/2006 | Persky | | 186/59 |
| 7,168,525 B1 * | 1/2007 | Jacobs | | 186/61 |
| 7,194,423 B2 * | 3/2007 | Walker et al. | | 705/14.35 |
| 7,200,511 B2 * | 4/2007 | Damrath | | 702/127 |
| 7,246,745 B2 * | 7/2007 | Hudnut et al. | | 235/383 |
| 7,461,785 B2 * | 12/2008 | Crockett et al. | | 235/383 |
| 7,575,161 B2 * | 8/2009 | Nguyen et al. | | 235/383 |
| 7,631,808 B2 * | 12/2009 | Kundu et al. | | 235/383 |
| 7,997,486 B2 * | 8/2011 | Ulrich et al. | | 235/383 |
| 8,430,311 B2 * | 4/2013 | Ostrowski et al. | | 235/383 |

* cited by examiner

*Primary Examiner* — Andrew Joseph Rudy
(74) *Attorney, Agent, or Firm* — Patterson & Sheridan, LLP

(57) ABSTRACT

A novel and useful mechanism and method for processing transactions on a point of sale system comprising of a conveyor system which continuously moves when one ore more items or items are resting on the conveyor system, and a sensing system to capture the information necessary to identify the items on the conveyor. When all items are correctly recognized by the sensing devices, the customer is charged for the items and an invoice is printed. In the event all the items are not correctly recognized the captured information is forwarded to a remote location for automated recognition processing and manual identification, if necessary. Once all the items are successfully identified, the customer is charged for the purchase and an invoice is processed and sent to the customer.

14 Claims, 4 Drawing Sheets

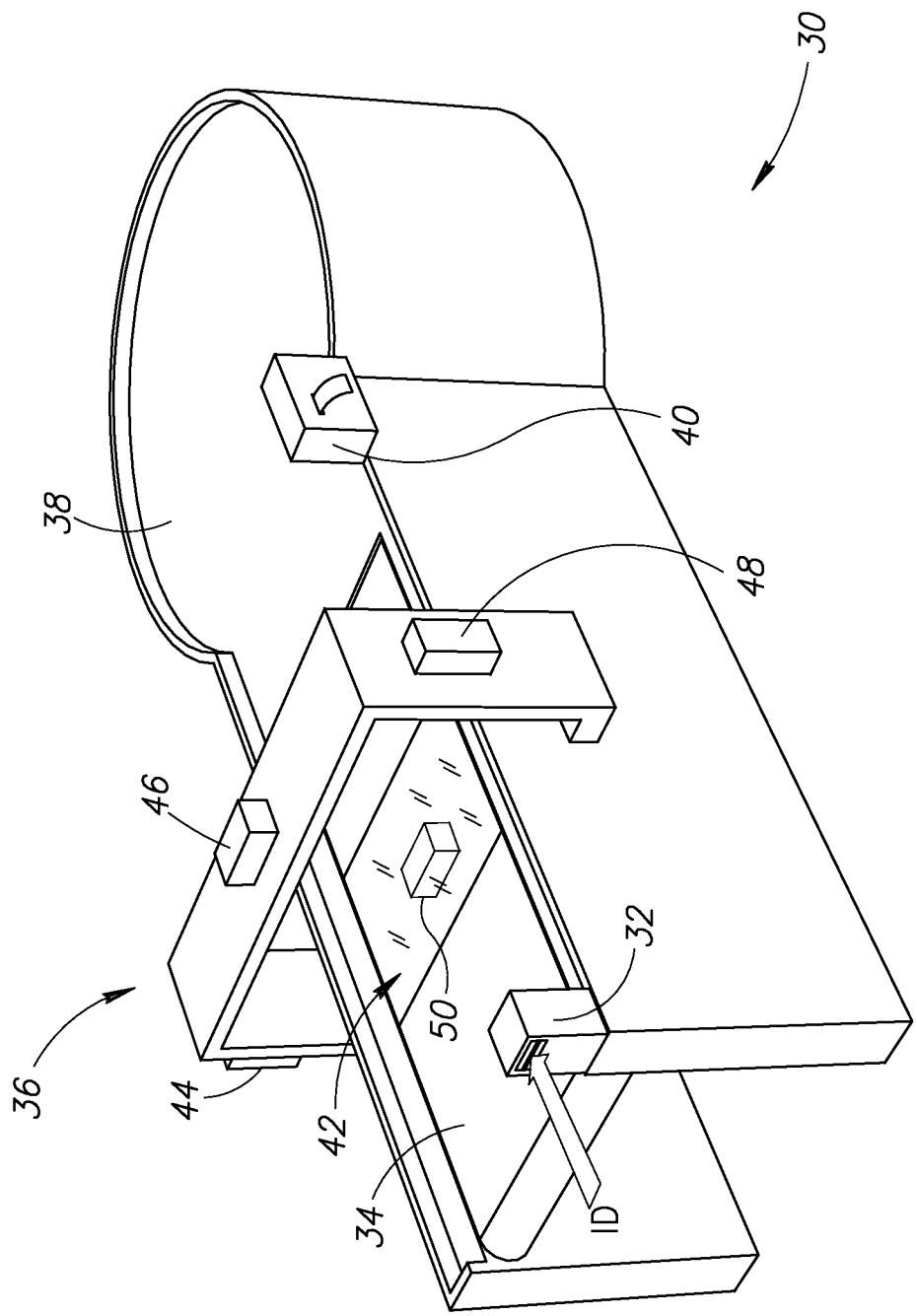

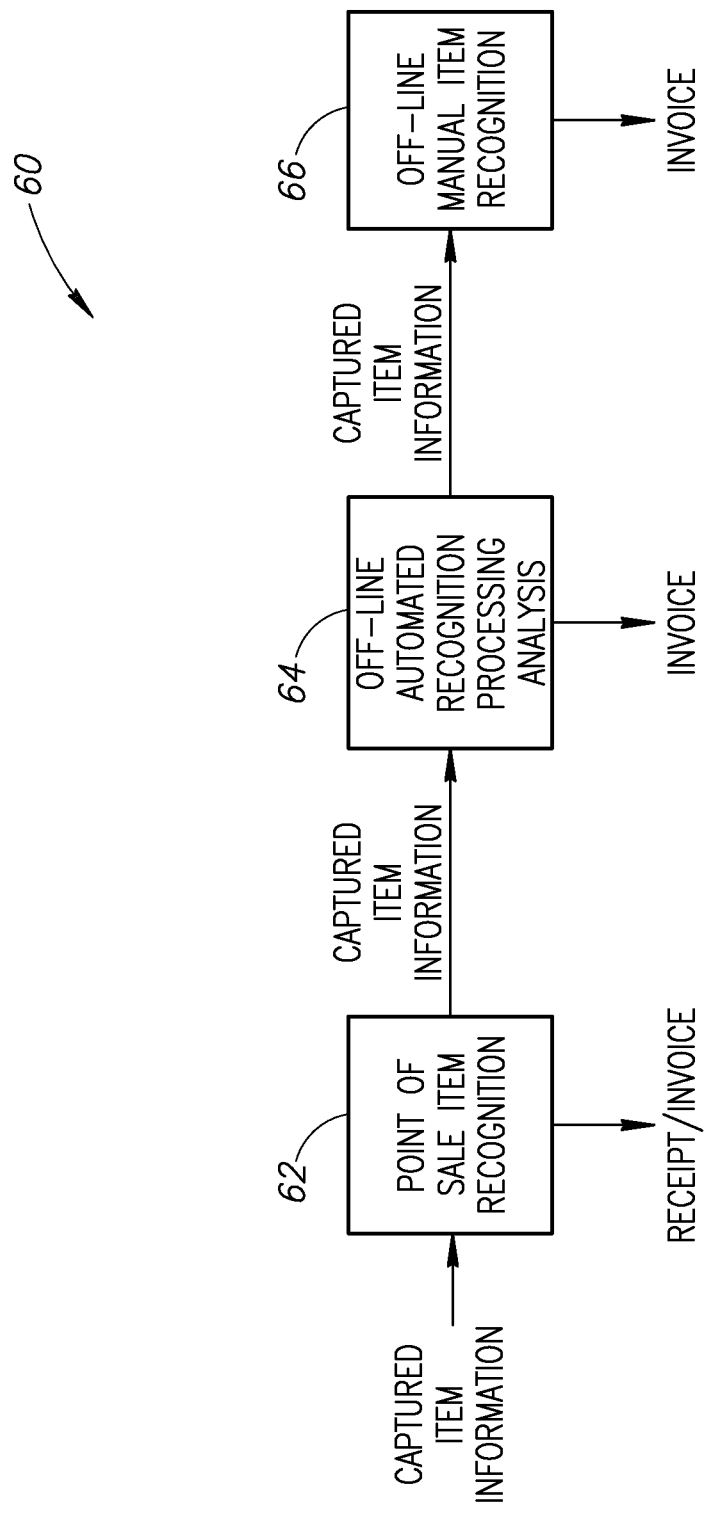

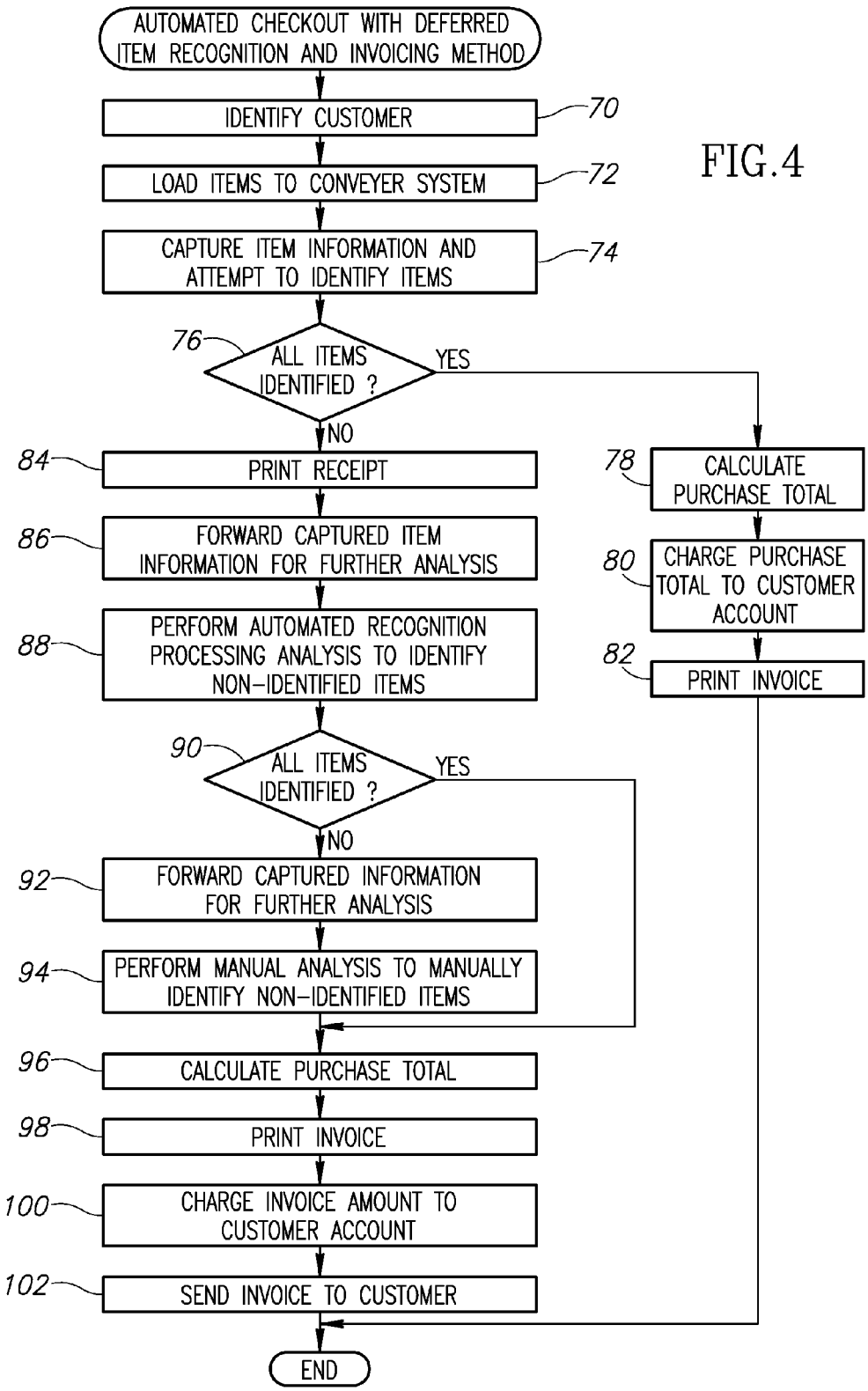

POINT OF SALE SYSTEM WITH ITEM IMAGE CAPTURE AND DEFERRED INVOICING CAPABILITY

FIELD OF THE INVENTION

The present invention relates to the field of point of sale retail transaction processing systems, and more particularly relates to a mechanism and method for processing self checkout retail transactions with the capability to perform item recognition and invoicing at a remote location at a later time.

SUMMARY OF THE INVENTION

There is thus provided in accordance with the invention, a first point of sale system comprising a conveyer system, the conveyor system continuously moving when one or more items are resting on the conveyor system, means for recognizing one or more items placed on the continuously moving conveyor system, means for identifying a customer purchasing the one or more items on the continuously moving conveyer system and means for producing a customer invoice for the one or more items placed on the continuously moving conveyer system.

The means for recognizing one or more items placed on the conveyor system referenced in the first point of sale system hereinabove resides in close proximity to the conveyor system.

The means for recognizing one or more items placed on the conveyor system referenced in the first point of sale system hereinabove resides at a remote location with respect to the conveyor system.

The means for producing a customer invoice referenced in the first point of sale system hereinabove resides in close proximity to the conveyor system.

The means for producing a customer invoice referenced in the first point of sale system hereinabove resides at a remote location with respect to the conveyor system.

There is also provided in accordance of the invention, a first method of processing a purchase at a point of sale system, the method comprising the steps of recognizing one or more items placed on a conveyor system, the conveyor system continuously moving, identifying a customer purchasing the one or items on the continuously moving conveyor system and invoicing the customer for the one or more items placed on the continuously moving conveyor system.

There is further provided a second point of sale system, comprising a conveyer system, means for capturing information for one or more items placed on the conveyer system, means for recognizing the one or more items placed on the conveyer system, means for identifying a customer purchasing the one or more items on the conveyer system, means for displaying the captured information at a remote location, means for correcting identification of the one or more previously recognized items at the remote location and means for invoicing the customer at the remote location for the one or more items placed on the conveyer system.

The conveyer system referenced in the second point of sale system hereinabove is continuously moving when one or more items are resting on the conveyor system.

There is also provided a second method of processing a purchase on a point of sale system, the method comprising the steps of capturing information for one or more items placed on a conveyer system, performing an initial analysis to recognize the one or more items placed on the conveyor system, identifying a customer purchasing the one or more items on the conveyor system, displaying the captured information at a remote location, performing a subsequent analysis at the remote location to recognize the one or more items placed on the conveyor system not recognized by the initial analysis and invoicing the customer at the remote location for the one or more items placed on the conveyer system.

The captured information referenced in the second method described hereinabove comprises on or more digital images.

The captured information referenced in the second method described hereinabove comprises the weight of each item placed on the conveyor system.

The initial analysis referenced in the second method described hereinabove is performed in close proximity to said conveyor system.

The subsequent analysis referenced in the second method described hereinabove is performed at a remote location with respect to the conveyor system.

The subsequent analysis referenced in the second method described hereinabove is performed via a computer program product.

The subsequent analysis referenced in the second method described hereinabove is performed manually.

The invoicing step referenced in the second method described hereinabove is performed in close proximity to the conveyor system in the event all of the one or more items placed on the conveyor system are correctly recognized during the step of performing said initial analysis.

The invoicing step referenced in the second method described hereinabove is performed at a remote location with respect to the conveyor system in the event all of the one or more items placed on the conveyor system are correctly recognized during the step of performing the subsequent analysis.

There is further provided a computer program product for processing a transaction on a point of sale system, the point of sale system comprising a conveyor system and means for digitally imaging items placed on said conveyor system, the computer program product comprising a computer usable medium having computer usable code embodied therewith, the computer program product comprising computer usable code configured for identifying one or more items from a digital image of the one or more items placed on the conveyor system and computer usable code configured for producing an invoice for the one or more identified items placed on the conveyor system.

BRIEF DESCRIPTION OF THE DRAWINGS

The invention is herein described, by way of example only, with reference to the accompanying drawings, wherein:

FIG. 2 is a is a block diagram illustrating an example point of sale system adapted to implement the automated checkout mechanism of the present invention;

FIG. 3 is a block diagram illustrating an example computer processing system adapted to implement the automated checkout with deferred item recognition and invoicing method of the present invention; and FIG. 4 is a flow diagram illustrating the automated checkout with deferred item recognition and invoicing method of the present invention.

DETAILED DESCRIPTION OF THE INVENTION

Notation Used Throughout

Figure 1:
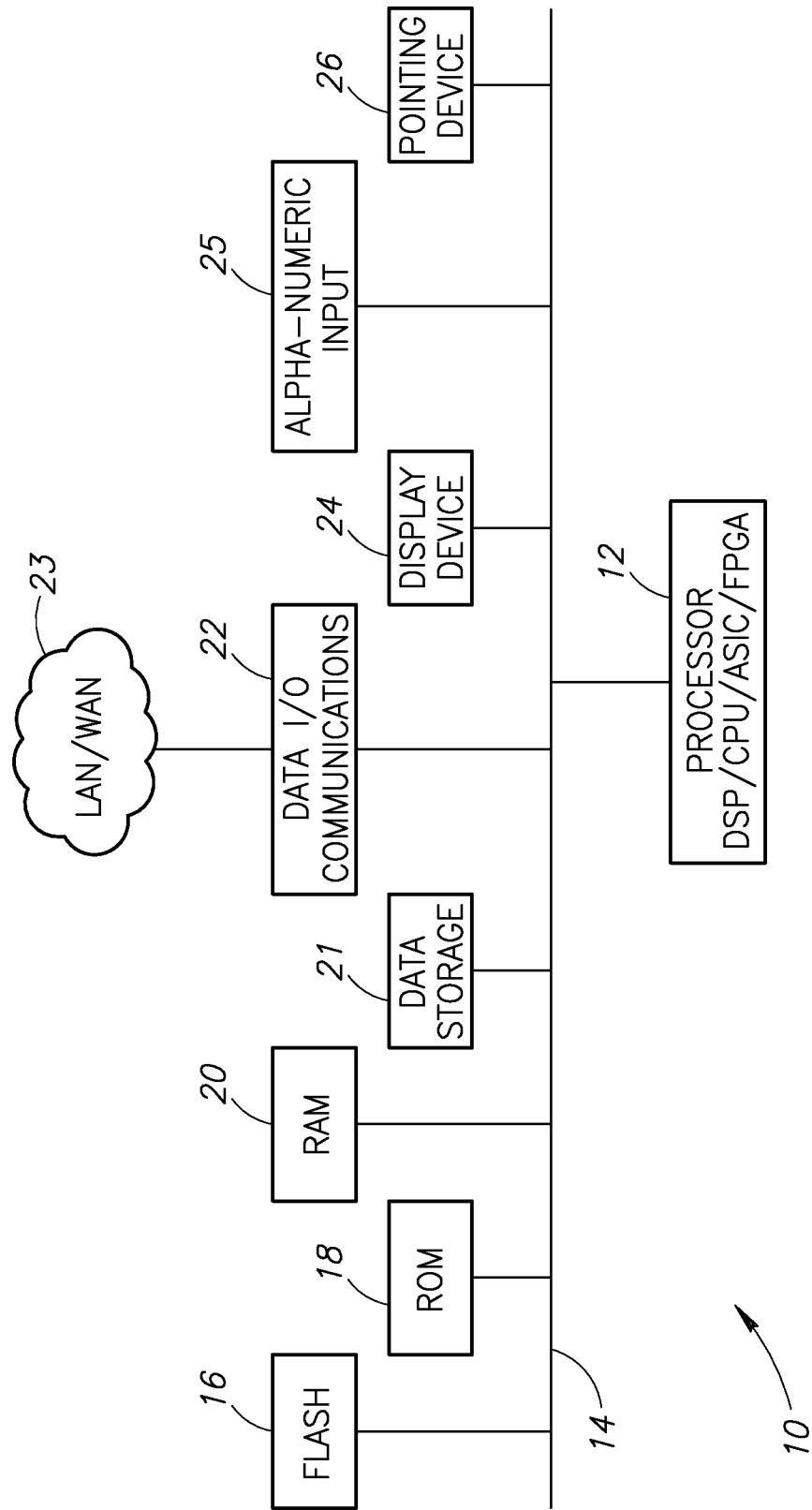
FIG. 1 is a block diagram illustrating an example computer processing system adapted to implement the automated checkout with deferred item recognition and billing method of the present invention.

The following notation is used throughout this document:

| Term | Definition |
| --- | --- |
| ASIC | Application Specific Integrated Circuit |
| CD-ROM | Compact Disc Read Only Memory |

-continued

| Term | Definition |
| --- | --- |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| PoS | Point of Sale |
| RAM | Random Access Memory |
| RF | Radio Frequency |
| RFID | Radio Frequency Identification |
| ROM | Read Only Memory |
| SCO | Self Checkout |
| WAN | Wide Area Network |

Detailed Description of the Invention

The present invention is a method of enabling a customer at a retail store to complete a purchase by placing their items on a continuously moving conveyor system (i.e. the conveyor system moves as long as there are items on the conveyor), where the items are scanned by appropriate sensing devices. The customer notifies the system of the payment method to be used and collects the items. If all items are correctly recognized by the sensing devices, the customer is charged for the items and an invoice is printed.

In the event the sensing devices do not correctly recognize all the items, a receipt is printed comprising digital images of the items purchased, and presented to the customer. The information captured by the sensing devices is then forwarded to a remote location. Automated recognition processing is then performed to attempt to identify the previously non-recognized items. If recognition processing fails to correctly identify all the items purchased, then images of the items on the conveyor system are displayed at a workstation and an operator manually identifies the items. Once all the items are successfully identified, the customer is charged for the purchase and an invoice is processed and sent.

One application of the invention is to facilitate the development of self checkout (SCO) point of sale (PoS) systems. SCO PoS systems implementing the method of the present invention will reduce operational costs and enable customers to quickly complete their purchases. Transmitting transactions with unidentified items to a remote location also reduces operational cost by enabling a retailer to level the workload between its various stores and take advantage of potentially lower labor costs at the remote location.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement the self checkout with deferred item recognition and billing method of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 52 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the self checkout with deferred item recognition and billing method of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the self checkout with deferred item recognition and billing method of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the self checkout with deferred item recognition and billing method of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Point of Sale System with Item Image Capture and Deferred Invoicing

In accordance with the invention, a customer initiates a transaction by presenting appropriate identification (e.g., credit card or a membership card) to a reader (e.g., magnetic or optical). Items are placed on a moving conveyor system (typically by the customer, but potentially by a store employee), where the items pass through a sensing section (i.e. of the PoS system). In addition to items, product coupons can be placed on the conveyor system as well. The customer then gathers their purchases at the collection area of the PoS system. If all items were correctly identified by the sensing section, the customer's account (e.g., but not limited to checking/debit card or credit card) is charged for the items purchased and an invoice is printed at a printing station. If all the items placed on the conveyor belt were not correctly identified, then a receipt is printed listing recognized items and a picture of each non-recognized item.

The PoS system is equipped with appropriate sensing devices that scan the items while they move on the conveyer, capturing images, signals, and other measurements. The captured information is processed to identify the item, which may be either immediately identified, or remotely handled (if identification initially fails). In the latter case these residual non-recognized items are directed to either for manual verification or automated recognition processing.

An example of a PoS system implementing the self checkout with deferred item recognition and invoicing mechanism of the present invention is shown in FIG. 2. The PoS system, generally referenced 30 comprises identification card reader 32, continuously moving conveyor system 34, sensing section 36, item collection area 38 and printer 40. Sensing section 36 is further comprised of weighing area 42 and sensors 44, 46, 48 and 50, which scan all four sides (i.e., top, bottom, left and right) of items as they pass through the sensing section.

The sensing section of the system is comprised of a combination of devices such as (1) barcode readers, (2) Radio Frequency Identification (RFID) readers, (3) digital cameras and (4) weight-scales. If an item is immediately identified (e.g., by a successful reading of the barcode), then an appropriate electronic record (meta-data) is associated with it, and stored in the computer system. If, however, immediate recognition was not achieved, or the system is not sure about the identification, then the captured information is sent to remote processing or either manual processing or automated item recognition analysis. During manual processing, remote operators examine the captured images, as well as other relevant information, enabling them to recognize the item (and its price). In one embodiment of the present invention, the sensing section is comprised of multiple digital cameras to achieve omni-directional imaging (e.g., top, bottom and sides) in order to facilitate the image processing. The digital cameras are activated by proximity detectors that identify presence of items on the conveyor.

Deferred Item Recognition and Invoicing

As discussed supra, if all the items are not correctly identified by the sensing section of the PoS system, then the order is sent for deferred item recognition and invoicing. In one embodiment of the present invention, any order (even those where all items were correctly identified at the PoS system) can be processed via deferred invoicing. In this deferred payment mode, consumers would put their goods on the continuously moving PoS conveyor system, proceed towards the other end of the conveyer (the collection area), pick up their goods and leave the store. They receipt will arrive at a later time (e.g., by mail or email), and the customer is billed accordingly (e.g., by charging their credit card).

The deferred item recognition method (i.e. identification of the items that were not immediately automatically recognized) of the present invention comprises two stages, automatic and manual. In the automatic stage, captured images are analyzed and correlated with other measurements (e.g., partial barcode reading, weight, previous purchases by the same customer etc). Since this processing is offline (i.e. with respect to the PoS system), full power of servers and sophisticated algorithms can be applied. In the manual stage, only items that were not recognized by the automatic stage are manually processed by operators who will inspect the captured images to identify the purchased items.

Once all the items have been processed, the system determines the price and processes the invoice. Payment can be collected by credit/debit card charging or by billing the customer who would then pay by check. The customer would receive a receipt (e.g., by postal mail or email) including items and prices, and optionally their images The deferred mode of item identification method of the present invention enables several advantages over conventional systems:

1. Manual processing can be performed at a remote location (as opposed to the store's back office) thus leveling the load between various stores of the same retail chain.

2. Manual processing can be performed in remote locations with low cost geographies.

3. Each item image can be automatically routed to an appropriate specialist (e.g. vegetable images would go to the expert on vegetable prices; detergent images would go the detergent expert etc.). This specialization will speed up the workflow and reduce errors.

4. The decoupling between the customers and the cashiers will reduce potential fraud activity that is a current problem in traditional PoS transactions.

5. Barcodes can be verified via image analysis of each item (i.e. either automatically or manually), therefore reducing the possibility of customers fraud comprising replacing barcodes on items.

6. The method of the present invention well suited to the transition period of increased use of RFID. As more items are tagged by RFID, automatic identification will be more accurate, further decreasing the manual labor necessary to process an order.

7. Deferred payment mode will facilitate use of debit cards reducing transaction interchange to the credit card companies.

A block diagram illustrating an example implementation of the deferred item identification and invoicing method of the present invention is shown in FIG. 3. The system block diagram, generally referenced 60 comprises PoS item recognition system 62, off-line automated (item) automated recognition processing analysis system 64 and off-line manual item recognition system 66.

In operation, captured item information is first input to the PoS item recognition system. If all the items are correctly recognized, then the purchase is processed and an invoice is printed at the PoS system. If all the items are not correctly recognized then a receipt is printed at the PoS system and information representing identified and non-identified items is forwarded to the automated item recognition processing system. Using powerful servers and sophisticated algorithms, the automated recognition processing analysis system attempts to recognize the previously non-identified items. If all the items are identified in this system then the purchase is processed and an invoice is generated. If all items are not identified at this point, then the information representing identified and non-identified items is forwarded to the manual item recognition system. In the manual item recognition system, manual operators review digital images of non-recognized items and identify the items. The purchase is then processed, and an invoice is generated.

A flow diagram illustrating the automated checkout with deferred item recognition and invoicing method of the present invention is shown in FIG. 4. First the customer is identified (step 70), typically by the customer inserting a credit or debit card into a card reader. The customer then loads the items to be purchased onto a continuously moving conveyor system (step 72) and sensors along the conveyor system capture item information and attempt to identify the items (step 74). If all the items are successfully identified (step 76) then the purchase total is calculated (step 78), the customer's account is charged (step 80) and finally, an invoice is printed (step 82). At this point the customer leaves the store with the purchased items and an invoice.

If all the items were not correctly identified by sensors along the continuously moving conveyor system, then a receipt is printed (step 84) comprising a list of the identified items and captured digital images (obtained in step 74) for the non-identified items (note that at this point the customer leaves the store with the items and a receipt). The captured information is forwarded to an off-site service center (step 86)

and automated recognition analysis is performed to identify the items (step 90). If all the items are identified at this point (step 90) then the purchase total is calculated (step 96), the customer is charged for the transaction (step 98), an invoice is printed (step 100) and finally, the invoice is sent to the customer (step 102), via postal mail, email, fax etc.

If all the items were not successfully identified in step 90 then the captured information is forwarded for manual analysis (step 92) where the items are manually identified (step 94) by analyzing the captured image. The method of the current invention then continues with step 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of processing a purchase at a point of sale system, said method comprising the steps of:
    recognizing in an initial analysis using a computer processing system, one or more items placed on a conveyor system dedicated to handling items associated with a single customer for the duration of said purchase, said conveyor system continuously moving when one or more items are resting on said conveyor system regardless of whether or not said one or more items are correctly recognized during said initial analysis;
    identifying, using said computer processing system, a single customer purchasing one or more items on said conveyor system;
    invoicing said single customer in close proximity to said conveyor system in the event all of said one or more items placed on said conveyor system are correctly recognized during said initial analysis; and
    invoicing said single customer at a remote location with respect to said conveyor system in the event items placed on said conveyor system that are not correctly recognized during said step of initial analysis are correctly recognized during a subsequent analysis.

2. The method according to claim 1, wherein invoicing said customer comprises:
    capturing information for one or more items placed on a conveyer system;
    displaying said captured information at a remote location;
    performing a subsequent analysis at said remote location to recognize said one or more items placed on said conveyor system not recognized by an initial analysis; and
    invoicing said customer at said remote location for said one or more items placed on said conveyer system.

3. The method according to claim 2, wherein said captured information comprises one or more digital images.

4. The method according to claim 2, wherein said captured information comprises the weight of each item placed on said conveyor system.

5. The method according to claim 2, wherein said initial analysis is performed in close proximity to said conveyor system.

6. The method according to claim 2, wherein said subsequent analysis is performed at a remote location with respect to said conveyor system.

7. The method according to claim 1, wherein said step of recognizing one or more items is performed in close proximity to said conveyor system.

8. The method according to claim 1, wherein said step of recognizing one or more items is performed at a remote location with respect to said conveyor system.

9. The method according to claim 1, wherein said step of invoicing is performed in close proximity to said conveyor system.

10. The method according to claim 1, wherein said step of invoicing is performed at a remote location with respect to said conveyor system.

11. The method according to claim 6, wherein said step of performing a subsequent analysis is performed via a computer program product.

12. The method according to claim 6, wherein said step of performing a subsequent analysis is performed manually.

13. The method according to claim 2, wherein said step of invoicing is performed in close proximity to said conveyor system in the event all of said one or more items placed on said conveyor system are correctly recognized during said step of performing an initial analysis.

14. The method according to claim 2, wherein said step of invoicing is performed at a remote location with respect to said conveyor system in the event all of said one or more items placed on said conveyor system are correctly recognized during said step of performing a subsequent analysis.

* * * * *